(12) United States Patent  
Kim

(10) Patent No.: US 9,307,062 B2  
(45) Date of Patent: Apr. 5, 2016

(54) PROTECTIVE CASE OF MOBILE TERMINAL

(75) Inventor: Yoon Young Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 622 days.

(21) Appl. No.: 13/493,093

(22) Filed: Jun. 11, 2012

(65) Prior Publication Data

US 2012/0322518 A1 Dec. 20, 2012

(30) Foreign Application Priority Data

Jun. 15, 2011 (KR) .................. 10-2011-0057903

(51) Int. Cl.
- *H04M 1/04* (2006.01)
- *F16M 11/10* (2006.01)
- *G06F 1/16* (2006.01)
- *F16M 13/00* (2006.01)

(52) U.S. Cl.
CPC ............... *H04M 1/04* (2013.01); *F16M 11/10* (2013.01); *F16M 13/00* (2013.01); *G06F 1/1626* (2013.01); *G06F 2200/1633* (2013.01)

(58) Field of Classification Search
CPC . H04M 1/02; H04M 1/0283; H04M 2250/00; H04B 1/3888; A45C 2011/002; A45C 2011/003; G06F 2200/1633
USPC ............................................ 455/575.1, 575.8
See application file for complete search history.

(56) References Cited

U.S. PATENT DOCUMENTS

| | | | | |
|---|---|---|---|---|
| 5,887,777 | A * | 3/1999 | Myles et al. | 224/578 |
| 6,772,879 | B1 * | 8/2004 | Domotor | 206/45.23 |
| 7,414,833 | B2 * | 8/2008 | Kittayapong | 361/679.27 |
| 8,312,991 | B2 * | 11/2012 | Diebel et al. | 206/45.24 |
| 8,424,829 | B2 * | 4/2013 | Lu et al. | 248/371 |
| 8,544,639 | B2 * | 10/2013 | Yang et al. | 206/45.2 |
| 8,672,126 | B2 * | 3/2014 | Rohrbach et al. | 206/320 |
| 8,684,174 | B2 * | 4/2014 | Sirichai et al. | 206/320 |
| 2004/0134812 | A1 * | 7/2004 | Yeh | 206/320 |
| 2010/0072334 | A1 * | 3/2010 | Le Gette et al. | 248/176.3 |
| 2010/0210329 | A1 * | 8/2010 | Merz | 455/575.8 |
| 2011/0266194 | A1 * | 11/2011 | Bau | 206/736 |
| 2012/0261304 | A1 * | 10/2012 | Busri | 206/736 |
| 2014/0131251 | A1 * | 5/2014 | Westrup et al. | 206/756 |

FOREIGN PATENT DOCUMENTS

WO 2010/036090 A2 4/2010

* cited by examiner

*Primary Examiner* — George Eng  
*Assistant Examiner* — Marcus Hammonds  
(74) *Attorney, Agent, or Firm* — Cha & Reiter, LLC

(57) ABSTRACT

A protective case of a mobile includes: a main body having a size and shape adapted to receive a mobile terminal; a first connecting unit provided at a side of the main body; a cover connected to the main body by the first connecting unit and pivotable to a front side and a rear side of the main body about the first connecting unit; a second connecting unit provided at a side of the cover; and a support connected to the cover by the second connecting unit and pivotable to a front side and a rear side of the cover about the second connecting unit.

20 Claims, 12 Drawing Sheets

PROTECTIVE CASE OF MOBILE TERMINAL

CLAIM OF PRIORITY

This application claims, pursuant to 35 USC 119, the benefit of the earlier filing date of a patent application filed in the Korean Intellectual Property Office on Jun. 15, 2011 and assigned serial number 10-2011-0057903, the entire contents of which is incorporated by reference herein.

BACKGROUND

1. Field of the Invention

The present invention relates to a protective case of a mobile terminal and, more particularly, to a protective case of a mobile terminal for protecting a mobile terminal from shock as well as for supporting the mobile terminal at various angles.

2. Description of the Related Art

A mobile terminal supports various communication functions based on mobility. The mobile terminal may support a voice call communication function, a text message sending and receiving communication function, and a data communication function, etc. As a result of the mobility, mobile terminals are becoming daily necessities of life.

Early mobile terminals supported limited communication functions due to poor support from hardware industries; however, current mobile terminals are being manufactured to be thinner and lighter, as well as sufficient to support various user functions, as a result of recent hardware and software developments. More particularly, with development and distribution of touch panels, thin and light terminals having a wide display region are emerging as trendy mobile terminals. However, the thin and light terminals supporting various user functions are generally more easily susceptible to being damaged by external shock. That is, when a preset shock is applied to a mobile terminal, the mobile terminal may be easily broken or damaged to the extent that the user functions may be no longer be supported normally.

In order to solve these problems, researches and developments for a protective case protecting a mobile terminal is currently being vigorously conducted. However, existing protective cases of a mobile terminal simply cover a display portion of the mobile terminal so as to protect the display or is made in the form of a sack so as to completely encase the mobile terminal. By doing so, the existing protective case may protect some portion of a mobile terminal but reduces the convenience of the mobile terminal to the user, so that users of mobile terminals would hesitate to buy the existing protective case and even when such protective case are purchased, the mobile terminal cannot be utilized properly.

SUMMARY OF THE INVENTION

The present invention provides a protective case of a mobile terminal for protecting a mobile terminal from external shock, for maintaining a thin external appearance of the mobile terminal, and for maximizing user functions.

In accordance with aspects of the present invention, there is provided a protective case of a mobile terminal including: a main body to which a mobile terminal is seated; a first connecting unit provided at a side of the main body; a cover connected to the main body by the first connecting unit and pivoted to a front side and a rear side of the main body about the first connecting unit; a second connecting unit provided at a side of the cover; and a support connected to the cover by the second connecting unit and pivoted to a front side and a rear side of the cover about the second connecting unit.

The protective case of a mobile terminal according to the present invention maintains a thin external appearance of the mobile terminal and protects the mobile terminal from an external shock. Particularly, the protective case enables a user to support the mobile terminal at various angles.

BRIEF DESCRIPTION OF THE DRAWINGS

The above features and advantages of the present invention will become more apparent from the following detailed description when taken in conjunction with the accompanying drawings, in which.

DETAILED DESCRIPTION

Exemplary embodiments of the present invention are described in detail with reference to the accompanying drawings. The same reference symbols are used throughout the drawings to refer to the same or like parts. Detailed descriptions of functions and structures incorporated herein that are well known by those of ordinary skill in the art may be omitted for clarity and simplicity so as to not obscure appreciation of the present invention.

Particular terms may be defined to describe the invention in the best manner. Accordingly, the meaning of specific terms or words used in the specification and the claims should not be limited to the literal or commonly employed sense, but should be construed in accordance with the spirit of the invention as described herein. The description of the various embodiments is to be construed as exemplary only and does not describe every possible instance of the invention. Therefore, it should be understood that various changes may be made and equivalents may be substituted for various elements of the invention.

Finally, the term “substantially” typically means that the recited characteristic, parameter, or value need not be achieved exactly, but that deviations or variations, including for example, tolerances, measurement error, measurement accuracy limitations and other factors known to those of ordinary skill in the art, may occur in amounts that do not preclude the effect the characteristic was intended to provide.

Figure 1:
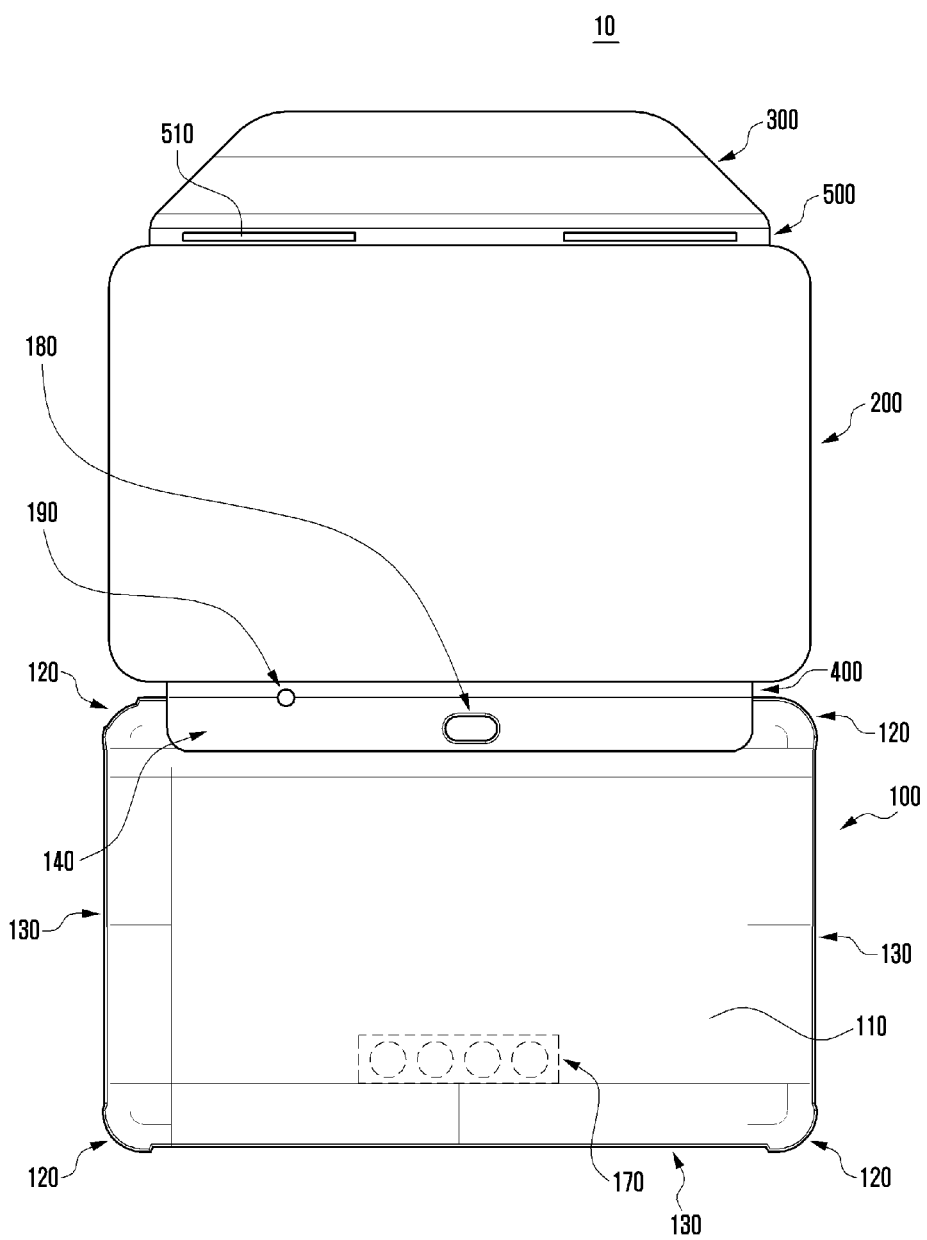
FIG. 1 is a front view illustrating an unfolded protective case of a mobile terminal according to an exemplary embodiment of the present invention.
Figure 2:
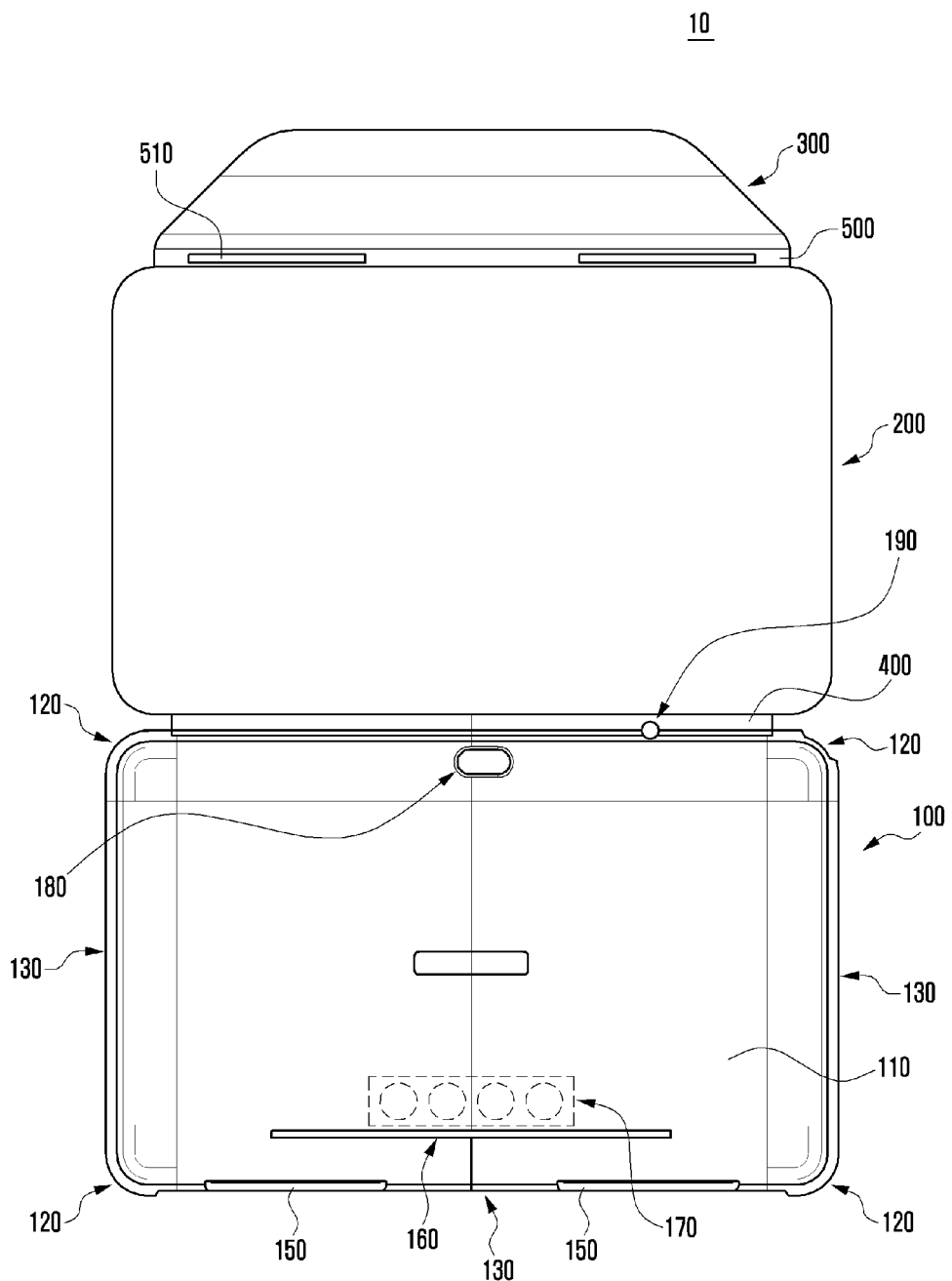
FIG. 2 is a rear view illustrating the unfolded protective case of a mobile terminal according to the exemplary embodiment of the present invention.
Figure 3:
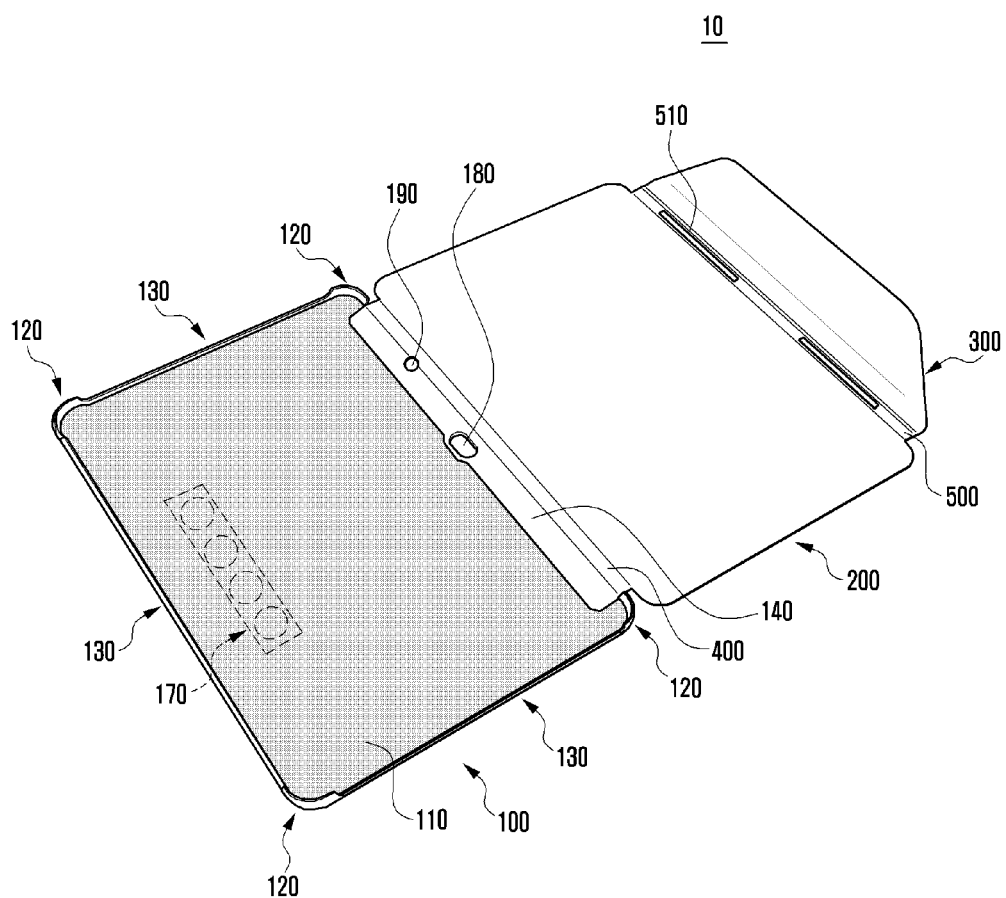
FIG. 3 is a perspective view illustrating the unfolded protective case of a mobile terminal according to the exemplary embodiment of the present invention.

FIGS. 1 to 3 are views schematically illustrating an outer appearance of a protective case 10 of a mobile terminal according to an exemplary embodiment of the present invention. FIG. 1 is a front view illustrating an unfolded state of the protective case 10, FIG. 2 is a rear view illustrating the unfolded state of the protective case 10, and FIG. 3 is a perspective view illustrating the unfolded state of the protective case 10.

Referring to FIGS. 1 to 3, the protective case 10 includes a main body 100, a cover 200, a support 300, a first connecting unit 400 connecting the main body 100 to the cover 200, and a second connecting unit 500 connecting the cover 200 to the support 300.

The protective case 10 of a mobile terminal may encase and protect the mobile terminal from an external shock when the mobile terminal is put on the main body 100, the cover 200 covers the front side of the mobile terminal, and the support 300 connected to the cover 200 comes in contact with and is temporarily fixed to the rear side of the main body 100. The protective case 10 of a mobile terminal may have a preset space defined by the main body 100 and the cover 200 for allowing the support 300 to pivot. With the protective case 10 of a mobile terminal having a preset space, the main body 100 may be positioned at a preset angle from the floor according to the position where the cover 200 is placed. Consequently, a mobile terminal may be placed on the main body 100 by an angle from the floor.

The main body 100 may include a plate portion 110 on which the mobile terminal is placed, corner guards 120 disposed at respective corners of the plate portion 110, fringe guards 130 provided at edges of the plate portion 110, a fixing unit 140 for fixing the first connecting unit 400 to the main body 100, a first slide-prevention unit 150, and a locking step 160. The fringe guards 130 may be omitted in accordance with design choice of the protective case 10.

In use, the plate portion 110 faces the rear side of the mobile terminal placed thereon, which plate portion 110 has a similar area as that of the rear side of the mobile terminal, and is made of hard material. The front side of the plate portion 110 may be provided with a soft layer made of a fluff material that comes into contact with the rear side of the mobile terminal so as to reduce friction with and to protect the rear side. The rear side of the plate portion 110 is a portion grasped by a user hand and may be made of a polycarbonate material. That is, the plate portion 110 may be made in the form of a carbonate plate with a front fluff layer. The rear side of the plate portion 110 may have graphic shapes formed therein so as to facilitate an easy grasp for the user. A first magnetic member 170 may be provided at a side of the plate portion 110. The first magnetic member 170 may be disposed in a region with which the support 300 comes in contact when the support 300 pivots to close the plate portion 110 and thereby temporarily fix the support 300 to the front side of the plate portion 110. The position to which the first magnetic member 170 is disposed may be a position where the first magnetic member 170 does not electrically affect the mobile terminal on the main body 100. The first magnetic member 170 is inserted into a hole formed at a side of the plate portion 110 such that the plate portion 110 is maintained thin. An end of the first connecting unit 400 is connected to the cover 200 for fixing the cover to the front side of the plate portion 110 of the main body 100.

The corner guards 120 are provided at corners of the plate portion 110 to fix the mobile terminal to the plate portion 110. When the plate portion 110 is rectangular, the corner guards 120 may be formed at respective corners to a preset height and a preset width. That is, the respective corner guards 120 may be formed such that both walls extend from the corners vertical to the plate portion 110 and are connected to each other while respective interfaces between the connected walls are rounded. The corner guards 120 have a curved shape to cover the corners of the mobile terminal and may be provided on the plate portion 110 such that the corners of the mobile terminal may be fitted thereinto to hold the mobile terminal on the plate portion 110.

The fringe guards 130 may be formed at the corners of the plate portion 110 by a preset height. That is, the fringe guards 130 may be formed at the respective corners of the plate portion 110 vertical to the plate portion 110 to have a preset radius of curvature. The fringe guards 130 may be disposed between the corner guards 120 and may have a height lower than that of the corner guards 120. The fringe guards 130 are provided at other corners of the plate portion 110 except for the front-side corners of the plate portion 110 so as to not interfere with the first connecting unit 400. The vertical height of fringe guards 130 are lower than the corner guards 120 such that sides of the mobile terminal on the main body 100 may be exposed and accessible to the user at sides of the main body 100.

Each of the fringe guards 130 may have a first slide-prevention unit 150 formed at an end thereof to prevent the main body 100 from being slid. The first slide-prevention units 150 may be made of synthetic rubber with high coefficient of friction such as NBR, rubber, etc., and may be provided at rear sides of the fringe guards 130 when viewing at the front side of the plate portion 110. The first slide-prevention units 150 may support the main body 100 so that it's bottom will not slid when the protective case of this exemplary embodiment is arranged to support the mobile terminal at a specific angle. To this end, the first slide-prevention units 150 may be provided, as shown in FIG. 2, on the outer surfaces of the fringe guards 130 at the edges of the main body 100 opposite to the first connecting unit 400.

As shown in FIG. 3, the fixing unit 140 fixes the first connecting unit 400 to a predetermined position of the plate portion 110. The first connecting unit 400 extends from the cover 200 and has an end disposed to cover an edge of the plate portion 100 where there is no fringe guard 130. In this case, the fixing unit 140 is made of a polycarbonate plate with a preset length and a preset width, so as to fix the end of the first connecting unit 400 to the edge of the plate portion 110, while at the same time maintaining a thin appearance for the protective case 10. The first connecting unit 400 may be fixed to the plate portion 110 by ultrasonic welding between the fixing unit 140 and the edge of the plate portion 110.

The fixing unit 140 may be provided a camera hole 180 at an end to expose a lens of a camera of a mobile terminal when placed on the main body 100. The fixing unit 140 may be provided with an earphone jack hole 190 at an end to expose an earphone jack of the mobile terminal and to allow a user to connect an earphone. Since the earphone jack may be provided at a sidewall of the mobile terminal, the earphone jack hole 190 may be provided an end of the first connecting unit 400.

The at least one locking step 160 is formed as a ridge at a rear side of the plate portion 110 to provide a place to selectively position in a fixed manner, a side of the support 300. The locking step 160 may be formed on the rear side of the plate portion 110 so as to have a height and length corresponding to a top sidewall of the support 300. When the support 300 is positioned so as to be locked by the locking step 160, the protective case 10 may be supported at an angle. The support by the locking step 160 will be described in detail later with reference to accompanying drawings.

The cover 200 has a similar shape as the main body 100. The cover 200 is made by forming skin portions made of non-slip polyurethane on front and rear sides of an epoxy plate. That is, the cover 200 may be provided by forming an upper skin portion and a lower skin portion on the front and rear sides, respectively, of the epoxy plate having an area corresponding to an area of the mobile terminal and having a preset thickness. Some of the skin portions of the cover 200 may extend from an edge of the epoxy plate to the main body 100 so as to form the first connecting unit 400 and extend to the support 300 to form the second connecting unit 500. The epoxy plate forming the cover 200 may be C-Cut ("C"-curvature cutting) manufactured using CAD/CAM software such as C-cut®, to control a computerized numerically controlled (CNC) cutting machine, in order that the finished shape of the epoxy plate can properly nest with the shape of the thin protective case 10. As previously described, the first connecting unit 400 connects the main body 100 to the cover 200 by extending the skin portion of the cover 200. By doing so, the first connecting unit 400 may be formed by bonding the upper skin portion to the lower skin portion. An end of the first connecting unit 400 may be fixed to the plate portion 110 by the fixing unit 140 at the edge of the plate portion 110 of the main body 100. The first connecting unit 400 may have a preset width such that the cover 200 pivots to open and close the protective case 10, and has a preset length to provide a firm support of the main body 100 after it is connected to the main body 100. The preset width of the first connecting unit 400 is also sufficient to provide the pivoting motion after the mobile terminal is placed on the main body 100. That is, the preset width of that portion of the first connecting unit 400 that pivots between the main body 100 and the cover 200 should be greater than the thickness of the mobile terminal.

The second connecting unit 500 is disposed at an opposite side from which the first connecting unit 400 is disposed, for connecting the support 300 to a side of the cover 200. The second connecting unit 500, like the first connecting unit 400, may be formed by bonding the upper skin portion to the lower skin portion. The second connecting unit 500 supports the support 300 so as to allow support 300 to pivot about the cover 200 by a preset angle. More particularly, the second connecting unit 500 provides a tensile force to the support 300 such that the support 300 may hold the main body 100 with a preset force when the support 300 is locked by the locking step 160 of the main body 100.

Figure 10:
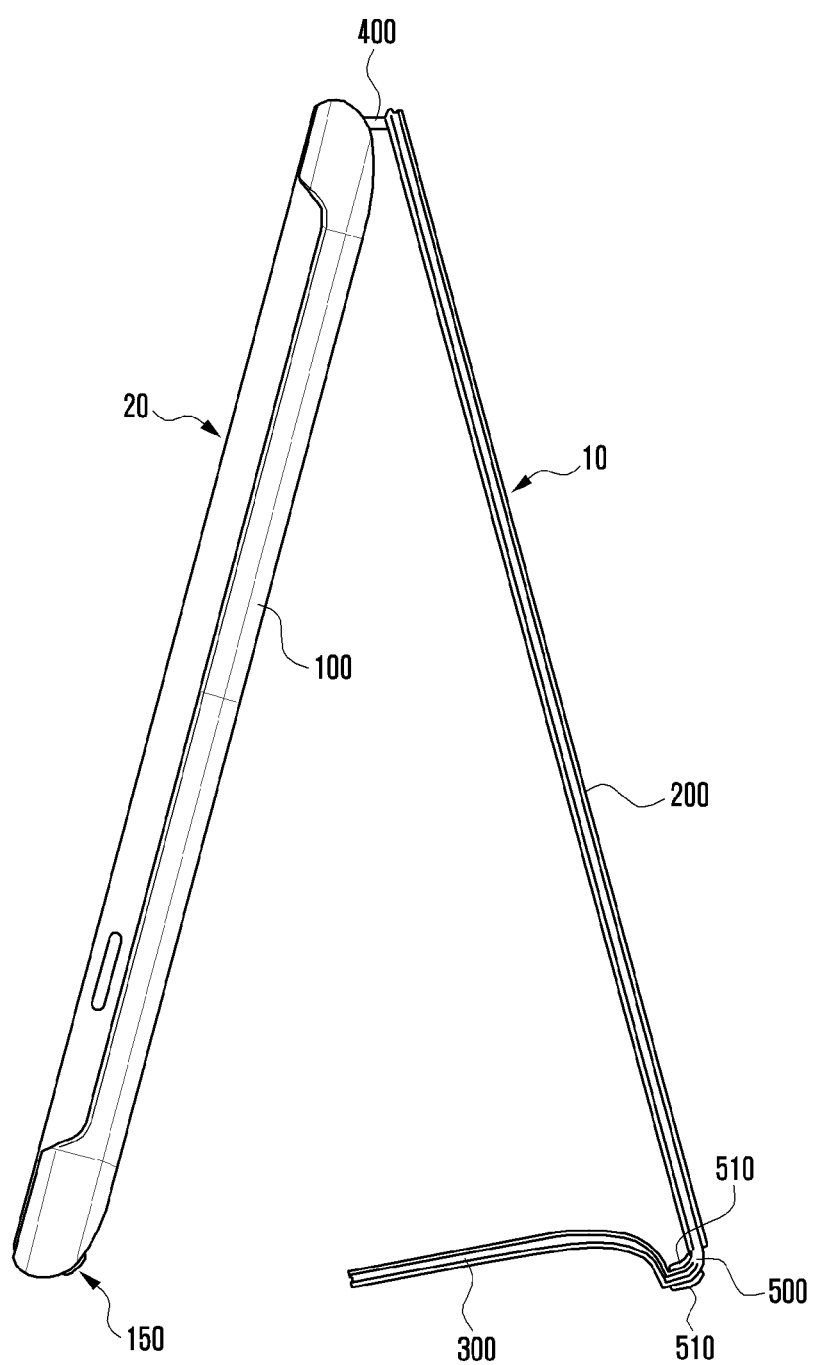
FIGS. 10 to 12 are perspective views illustrating a second supported state of the protective case of a mobile terminal according to the exemplary embodiment of the present invention.

The second connecting unit 500 may have second slide-prevention units 510 disposed parallel to the inside of the second connecting unit 500, that is, the front side of the plate portion 110. The second slide-prevention units 510 support the cover 200 such that the cover 200 will not slid on the floor when the mobile terminal is positioned on the main body 100 and is supported by an angle (such as shown in FIG. 10). The second slide-prevention units 510, like in the first slide-prevention unit 150, may be made of synthetic rubber having a high coefficient of friction. Since the second connecting unit 500 is substantially made of skin portions except for the epoxy plate, the second slide-prevention units 510 may have a width similar to or less than the thickness of the cover 200 even though the second slide-prevention units 510 are formed inside the second connecting unit 500. The second slide-prevention units 510 may be formed on a side parallel to the outside of the second connecting unit 500, that is, the rear side of the plate portion 110.

The support 300 may be disposed such that when the cover 200 covers whole area of the mobile terminal on the main body 100, it may pivot from the cover 200 to the rear side of the main body 100 so as to come in contact with the rear side of the main body 100. In this case, the support 300 may securely come in contact with and be selectively fixed to the rear side of the main body 100, attraction caused by the magnetic members 170. The support 300 will be described in detail with reference to FIG. 4.

FIG. 4 is an enlarged view of the support 300 of the protective case 10 of a mobile terminal according to the exemplary embodiment of the present invention.

Figure 4A:
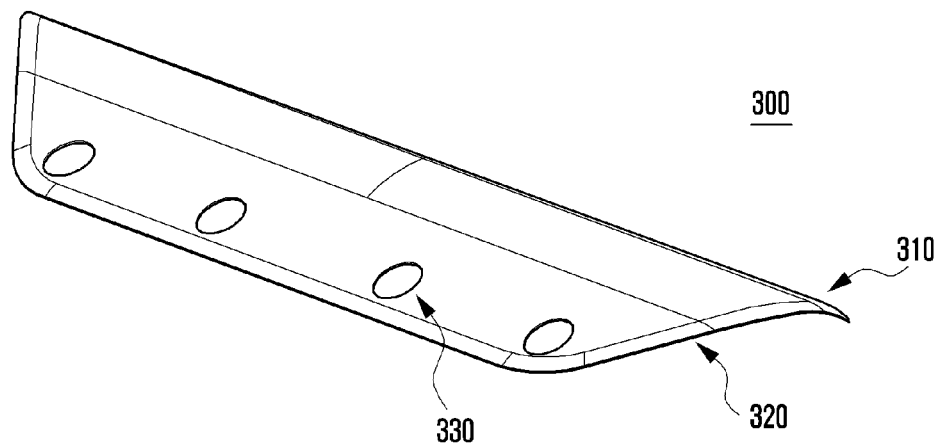
FIGS. 4A and 4B illustrate enlarged perspective views taken in two different directions of a support portion of the protective case of a mobile terminal according to the exemplary embodiment of the present invention.
Figure 4B:
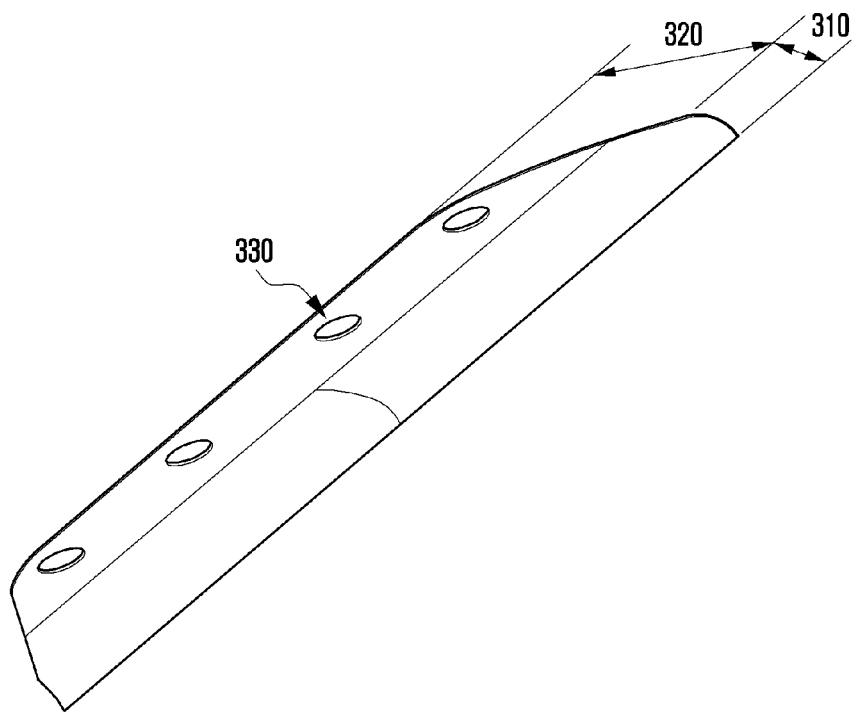
Figure 5:
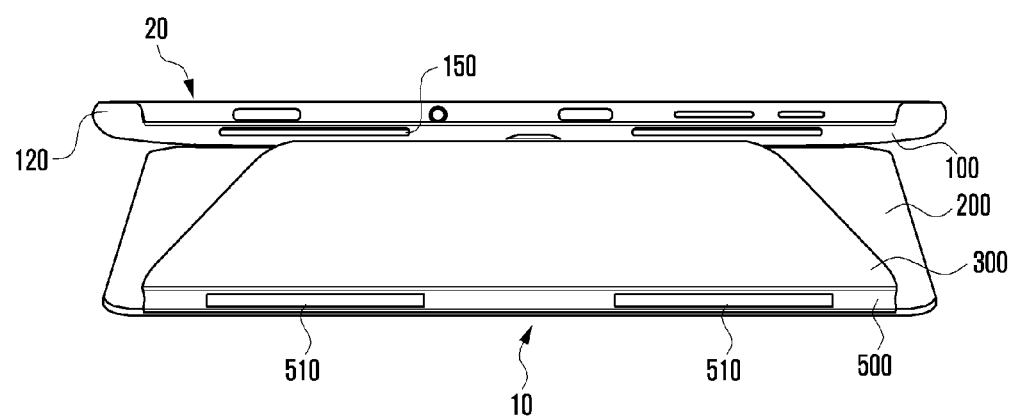
FIGS. 5 to 9 are perspective views illustrating a first supported state of the protective case of a mobile terminal according to the exemplary embodiment of the present invention.
Figure 6:
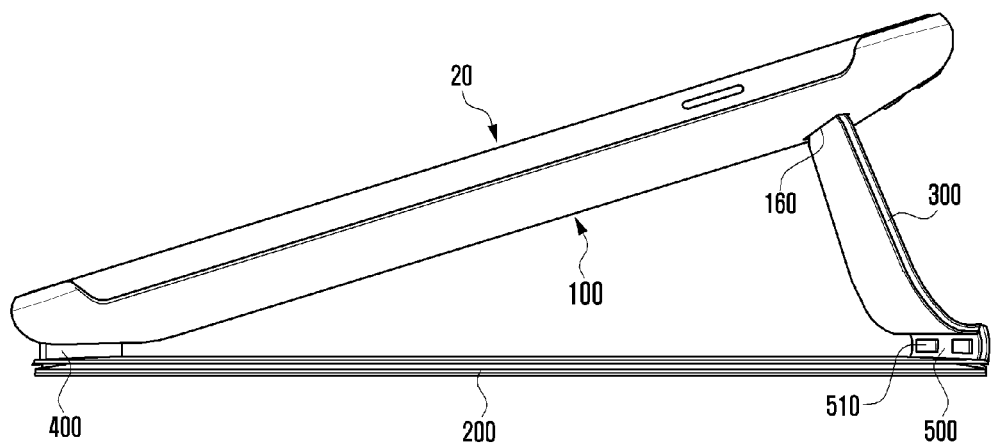
Figure 7:
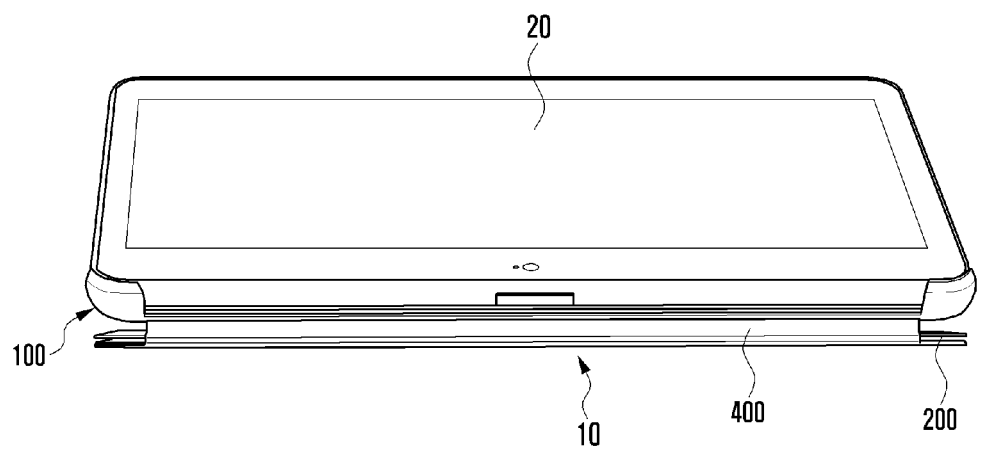
Figure 8:
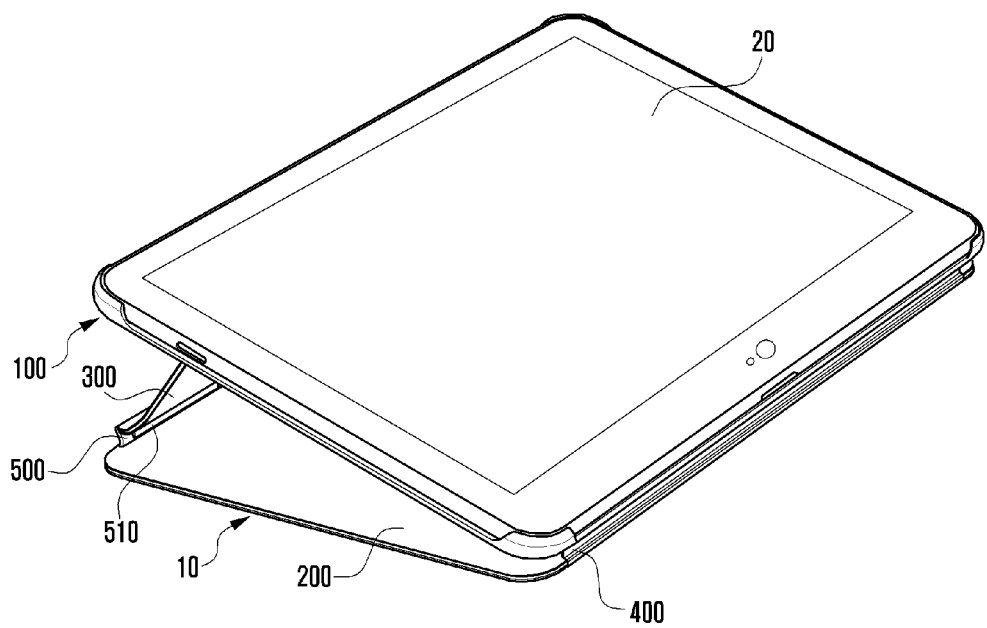
Figure 9:
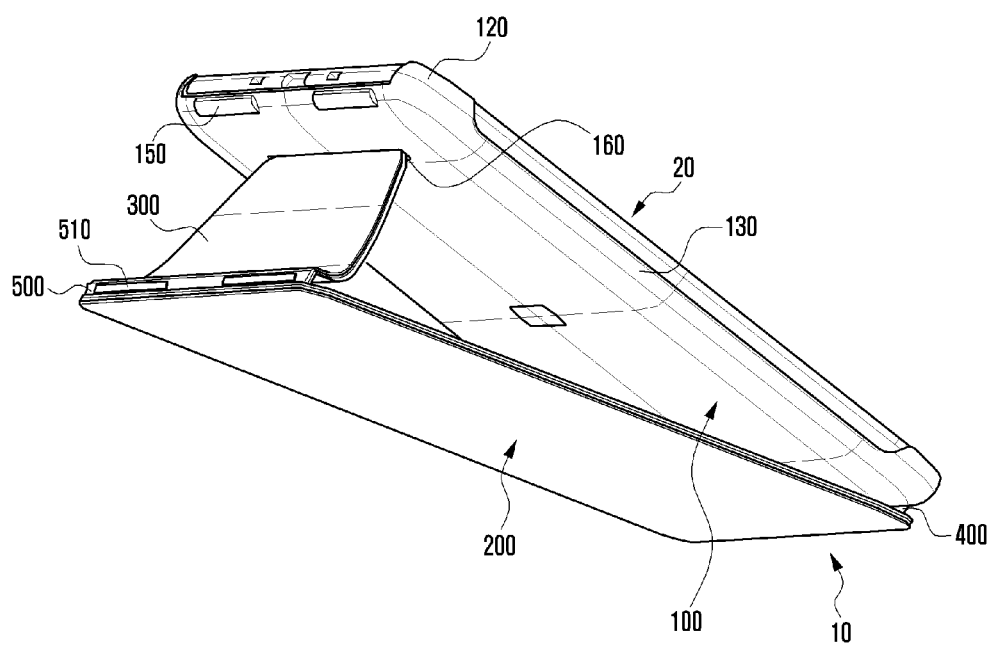

Referring to FIGS. 4A and 4B, the support 300 may include a curved portion 310 connected to the second connecting unit 500 and having a preset radius of curvature and a supporting plate 320 connected to the curved portion 310 to come in contact with the rear side of the main body 100 or to be partially locked by the locking step 160 of the main body 100 according to the supported state. The support 300 may have holes formed at a portion of the supporting plate 320 wherein second magnetic members 330 are disposed in the respective holes. The support 300 may be made of metal such as aluminum, having a preset strength. When the support 300 is made of a material that can generate an attractive force against a magnet, such as steel, the second magnetic members 330 may be omitted and the magnetic members 170 will selectively fix supporting plate 320 to the rear side of the main body 100.

The supporting plate 320 may have a trapezoidal shape with a width that is gradually reduced towards its distal end, that is, an end opposite its connection to the second connecting unit 500. By doing so, the locking step 160 of the main body 100 may be shaped to have a length and a width sufficient for selectively receiving to be locked therein, the distal end of the supporting plate 320. The supporting plate 320 may be made of a hard material such as aluminum or alloys thereof to securely support the main body 100 on which the mobile terminal is seated.

The curved portion 310 may support the supporting plate 320 to come in contact with the rear side of the cover 200 and to be supported by a preset angle and may encase the mobile terminal 10 seated on the main body 100 when the cover 200 pivots toward the front side of the main body 100. The curved portion 310 extends from the supporting plate 320 and may be made of the same material as that of the supporting plate 320.

The second magnetic members 330 may be disposed in the holes of the supporting plate 320 and may have a thickness similar to the depth of the holes, so as to maintain the supporting plate 320 thin. By doing so, the supporting plate 320 may be thin even when the second magnetic members 330 are disposed on the supporting plate 320. The second magnetic members 330 may come in contact with the first magnetic member 170 that is provided on the rear side of the main body 100, depending on a pivoted angle of the support 300.

The supporting plate 320, the curved portion 310, and the second magnetic members 330 have skin portion formed on front and rear sides thereof, in a manner similar to that described above for the cover 200. That is, the support 300 may have an upper skin portion formed on an upper side of the supporting plate 320 and a lower skin portion formed on a lower side of the supporting plate 320 and the curved portion 310. The upper skin portion and the lower skin portion of the support 300 may be connected to the skin portion of the second connecting unit 500 and consequently connected to the upper skin portion and the lower skin portion of the cover 200.

The support 300 supports the cover 200 and the main body 100 to have a preset space by the curved portion 310 connected to the supporting plate 320. That is, when the support 300 pivots to the rear side of the cover 200, the support 300 connected to the second connecting unit 500 may be disposed such that some of the curved portion 310 comes in contact with the rear side of the cover 200 first and the supporting plate 320 is disposed at a slope of a preset angle from the rear side of the cover 200. In this case, a side of the supporting plate 320 is locked by the locking step 160 of the main body 100 to form the preset space between the main body 100 and the cover 200, as next described.

FIGS. 5 to 9 are views illustrating a first supported state of the protective case 10 of a mobile terminal according to the exemplary embodiment of the present invention.

Referring to FIGS. 5 to 9, the protective case 10 of a mobile terminal may provide the first supported state, where a mobile terminal 20 is seated on the main body 100, the cover 200 pivots to the rear side of the main body 100, and the support 300 connected to the cover 200 supports the rear side of the main body 100.

More specifically, the mobile terminal 20 comes in contact with the corner guards 120 and the fringe guards 130 of the main body 100 so as to be seated on the front side of the main body 100. At this time, the corner guards 120 may have a similar size as the mobile terminal 20 such that the mobile terminal 20 may be fixedly held inside the corner guards 120 by a tight fit. The mobile terminal 20 seated on the main body 100 is prevented from moving due to the pressure exerted on the corners thereof by the corner guards 120. Sides of the mobile terminal 20 may be exposed to the exterior through the fringe guards 130 which are lower in height than the height of the corner guards 120.

The cover 200 that is connected to the main body 100 through the first connecting unit 400 on which the mobile terminal 20 is seated pivots to the rear side of the main body 100 such that the front side thereof faces the floor. The support 300 connected to the cover 200 through the second connecting unit 500 pivots the rear side of the cover 200 such that the upper sidewall thereof is inserted into and locked by the locking step 160 formed on the rear side of the main body 100. By doing so, the support 300 may be disposed at a preset angle from the edge of the cover 200, and the main body 100 placed on the support 300 may be connected to the opposite edge of the cover 200 through the first connecting unit 400, so as to incline the main body 100 by the support 300 and form the first supported state for the protective case 10.

A user may use the mobile terminal 20 by putting the mobile terminal 20 on the front side of the main body 100 while the front side of the cover 200 is disposed on the floor and the main body 100 is inclined at a preset angle by the support 300. The mobile terminal 20 supported by a preset angle provides a convenient viewing angle for a user during typewriting and supports easy typewriting when using a keymap displayed on the display of the mobile terminal 20.

Although a single locking step 160 is formed on the rear side of the main body 100 in the illustrated embodiment, the present invention is not limited thereto. That is, a plurality of locking steps may be formed on the rear side of the main body 100 at a preset spacing. In this case, the support 300 locked by the locking steps of the main body 100 may be locked at different positions according to the spacing of the locking steps so that the inclination angle of the main body 100 from the cover 200 may be adjustable to various angles. By doing so, a user may place the mobile terminal 20 at various angles in order to improve the ergonomics of the mobile terminal.

Figure 11:
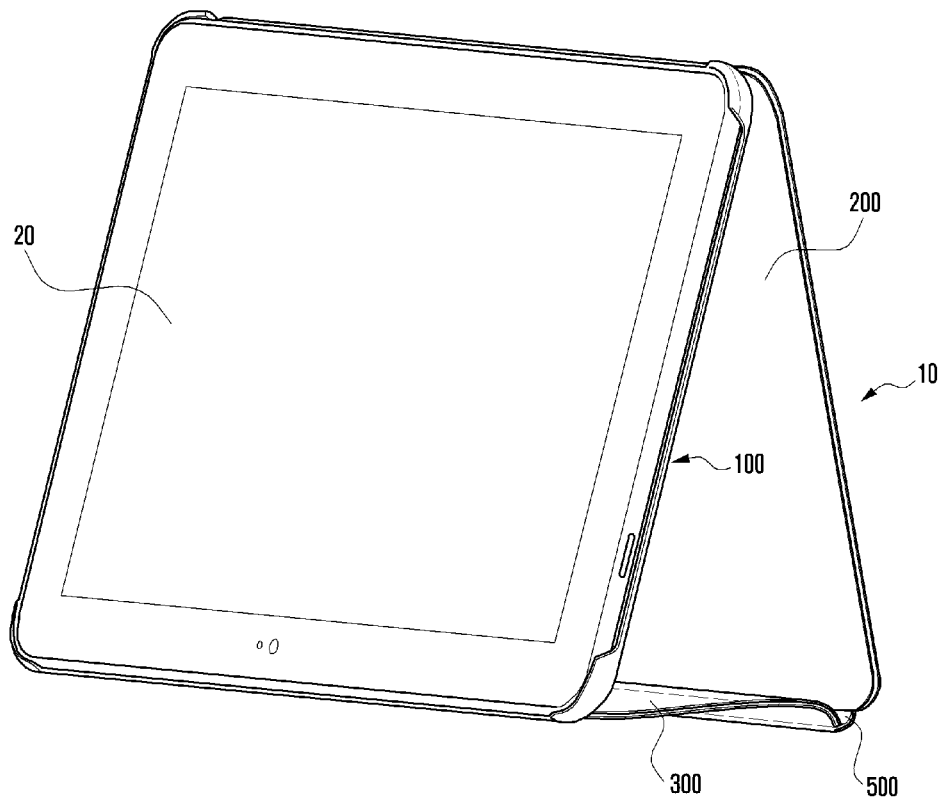
Figure 12:
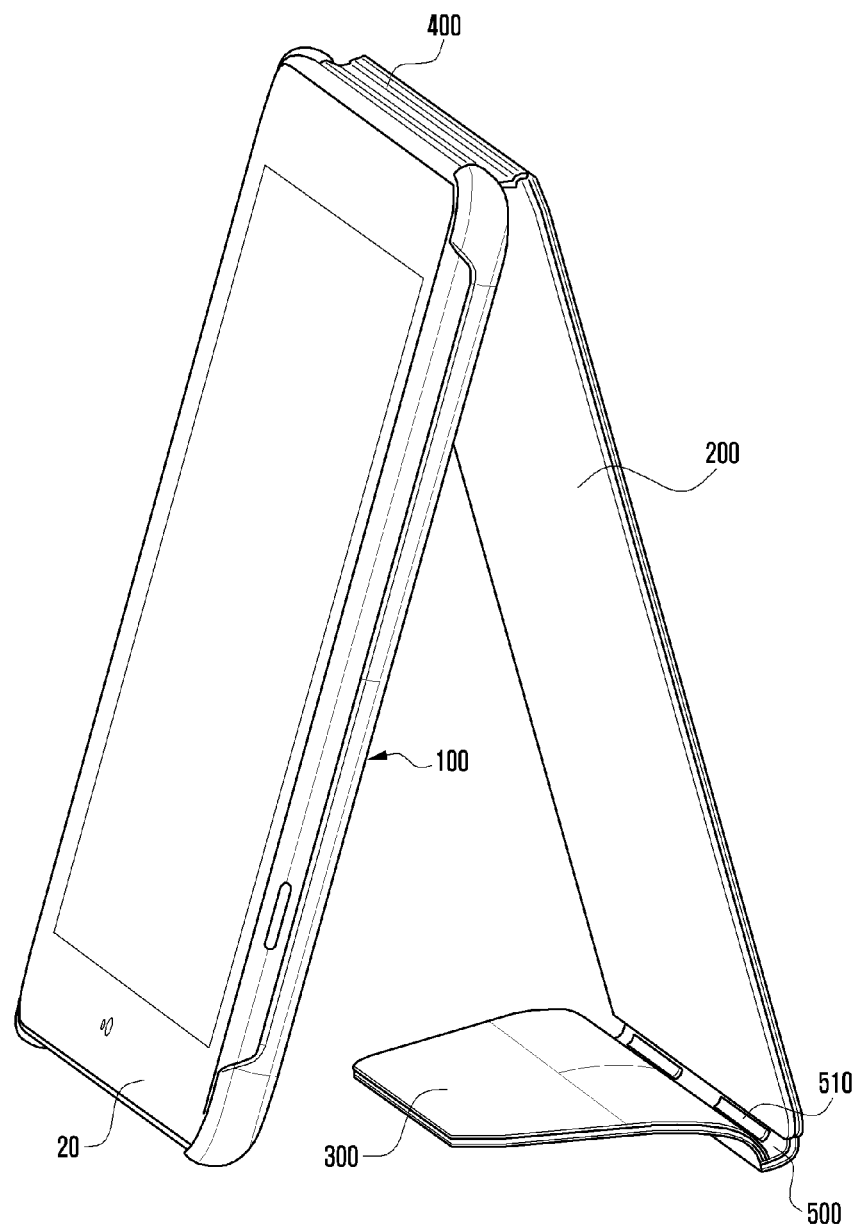

FIGS. 10 to 12 are views illustrating a second supported state of the protective case 10 of a mobile terminal according to the exemplary embodiment of the present invention.

Referring to FIGS. 10 to 12, the protective case 10 may provide a second locked state where a sidewall of the main body 100, a sidewall of the cover 200, a portion of the second connecting unit 500, and the support 300, contact the floor. In more detail, the protective case 10 may put the mobile terminal 20 on the front side of the main body 100 using the corner guards 120 and pivot the cover 200 to the rear side of the main body 100. While in this position, the first slide-prevention unit 150 is provided on the outer side of the fringe guard formed at the edge opposite to the edge to which the cover 200 is connected. When the main body 100 comes in contact with the floor, the first slide-prevention unit 150 substantially comes in contact with the floor. In this case, as described above, since the first slide-prevention unit 150 is made of a material with high coefficient of friction, the main body 100 may be prevented from being slid on the floor.

When the cover 200 pivots to the rear side of the main body 100 about the first connecting unit 400, an edge of the cover 200, particularly the edge to which the second connecting unit 500 is connected may come in contact with the floor. At the same time, the second connecting unit 500 comes in contact with the floor together with the edge of the cover 200. The support 300 connected to the second connecting unit 500 may also come in contact with the floor. Since the support 300, as described above, has the curved portion 310, the edge of the curved portion 310 connected to the second connecting unit 500 and a part of the upper side of the supporting plate 320 may come in contact with the floor. A side of the cover 200 contacting with the floor, the second connecting unit 500 and the support 300 have surfaces which include non-slip polyurethane. The non-slip polyurethane may prevent the cover 300 from being slid on the floor due to high coefficient of friction. The second connecting unit 500 may be provided with the second slide-prevention units 510 having a high coefficient of friction at the inside of the second connecting unit 500 such that the second slide-prevention units 510 face the floor when the support 300 pivots to the rear side of the cover 200 about the second connecting unit 500. Consequently, the second slide-prevention units 510 of the second connecting unit 500 face the floor so that the cover 200 may be securely prevented from being slid on the floor.

As described above, according to the protective case 10 of a mobile terminal, the angle between the main body 100 and the cover 200 is adjusted with respect to the first connecting unit 400 between the main body 100 and the cover 200 so that a user may support the mobile terminal 20 seated on the main body 100 at a desired one of various angles. The second supported state, where the main body 100 and a side of the cover 200 come in contact with the floor simultaneously, may provide a relatively larger supporting angle than in the first supported state. Thus, the protective case 10 may provide the second supported state to reduce fatigue of a user and to provide a comfortable viewing angle when the mobile terminal 20 is used for various purposes, such as a calendar function for managing schedule, seeing a moving picture, a photo album, etc.

When the plate portion 110 is made of polycarbonate, as described above, it provides excellent absorption and distribution of shock. Similarly, the fringe guards 130 and the corner guards 120 provided at the edge and corners of the plate portion 110, enable the protective case 10 to effectively absorb and distribute shock in the event that the mobile terminal 20 held in the protective case 10 falls from a preset height or collides with something.

Although the support 300 pivots to the rear side of the cover 300 to form the second supported state, the preset invention is not limited thereto. That is, the support 300 may pivot to the front side of the cover 200 to user's preference and, in this case, the outer side of the support 300 may face the floor. When the outer side of the support 300 faces the floor, the outer side of the second connecting unit 500 may also face the floor. In this case, the second slide-prevention units 510 on the outer side of the second connecting unit 500 may come in contact with the floor to securely support the cover 200 and prevent it from sliding.

Additionally, it is noted that the above-described mobile terminal 20 may include further supplementary elements such as a short range wireless communication module for short-range wireless communications, a broadcasting module for receiving broadcasting, a digital sound reproducing module such as an MP3 module, and an Internet communication module.

Thus, the mobile terminal according to an exemplary embodiment of the present invention may include any mobile communication terminal that is operated under a communication protocol corresponding to various communication systems, as well as a portable projector module, an information communication device, a multimedia device (or an application thereof, such as a portable multimedia player (PMP) having a projector module), a digital broadcasting player, a personal digital assistant (PDA), a portable game terminal, a smart phone, and the like. Substantially, the protective case 10 of the present invention protects the mobile terminal 20 and may be manufactured to provide the supported state at various angles. The mobile terminal 20 to which the protective case 10 of the present invention is applied is not limited to types and shapes of the mobile terminal 20 and the size and shape of the protective case 10 of the present invention may be changed or modified according to the size and shape of the mobile terminal 20.

While the present invention has been particularly shown and described with reference to exemplary embodiments thereof, it will be understood by those of ordinary skill in the art that various changes in form and details may be made therein without departing from the spirit and scope of the present invention, which is defined only by the following claims and their equivalents.

What is claimed is:

1. A protective case of a mobile terminal comprising:
  a main body having a front side adapted to receive a mobile terminal, and a rear side opposite the front side;
  a first connecting unit provided at a side of the main body;
  a cover connected to the main body by the first connecting unit, the first connecting unit pivotable to allow rotation of the cover about the first connecting unit;
  a second connecting unit provided at a side of the cover; and
  a support connected to the cover by the second connecting unit, the second connecting unit pivotable to a front side and a rear side of the cover allowing rotation of the support about the second connecting unit, the support further including a preset radius of curvature, and connected to the second connecting unit;
  a first slide-prevention unit formed on a front surface of the pivotable second connecting unit and a second slide-prevention unit formed on a rear surface of the pivotable second connecting unit,
  wherein when the cover covers the front side of the main body, the support connected to the cover is disposed on the rear side of the main body, and
  wherein the rear side of the main body further includes a third slide-prevention unit, and the second slide-prevention unit is at least partially enclosed by the support and the cover when the cover is rotated about the main body by the first connecting unit to stand the mobile terminal.

2. The protective case of claim 1, wherein the main body comprises:
  a plate portion having on its front side an area of similar shape to an area of the mobile terminal to be received thereon;
  corner guards extended from respective corners of the plate portion to encase respective corners of the mobile terminal to be received; and
  fringe guards extended upward, by a preset height, from at least one of a plurality of edge regions of the front side of the plate portion.

3. The protective case of claim 2, further comprising:
  a fluff layer formed on the front side of the plate portion; and
  a fixing unit fixing the first connecting unit to the edge of the plate portion.

4. The protective case of claim 3, further comprising a camera hole penetrating a side of the fixing unit to expose a lens of a camera of the mobile terminal to be received on the plate portion of the main body.

5. The protective case of claim 1, wherein the cover comprises:
  a plate member made of a material sufficiently hard to provide protection to a portable terminal when received on the main body;
  an upper skin portion provided on the front side of the plate member; and
  a lower skin portion provided on the rear side of the plate member.

6. The protective case of claim 5, wherein the first connecting unit is formed by extending the upper skin portion and the lower skin portion from the plate member and bonding the upper and lower skin portions together and to the main body.

7. The protective case of claim 5, wherein the second connecting unit is made by extending the upper skin portion and the lower skin portion from the plate member and bonding the upper and lower skin portions together and to the support.

8. The protective case of claim 5, wherein the support comprises:
  a supporting plate made of a material sufficiently hard to provide protection to a portable terminal when received in the main body;
  a curved portion connected to the supporting plate and having the preset radius of curvature; and
  skin portions covering front and rear sides of the supporting plate and the curved portion.

9. The protective case of claim 8, wherein the skin portions of the supporting plate are connected to the second connecting unit and the upper and lower skin portion of the cover, respectively.

10. The protective case of claim 8, wherein the skin portions of the supporting plate are made of non-slip polyurethane.

11. The protective case of claim 8, wherein the main body further comprises a first magnetic member provided at a side thereof.

12. The protective case of claim 11, further comprising:
  a hole formed at a side of the supporting plate; and
  a second magnetic member having a substantially same height as that of the hole in the supporting plate, disposed in the hole, and coming in contact with and temporally fixing to a side of the main body on which the first magnetic member is disposed.

13. The protective case of claim 5, further comprising an earphone jack hole penetrating the front and rear sides of at least one of the cover and the first connecting unit to expose an earphone jack of the mobile terminal to be received on the plate member of the main body.

14. The protective case of claim 1, further comprising at least one locking step formed on a rear side of the main body and disposed at a point inwards from a terminal edge of the main body for coupling the support to the rear side of the main body.

15. The protective case of claim 14, wherein when the cover is rotated about the main body by the first connecting unit to angle the mobile terminal relative to a surface and supported on the cover, the support is pivoted about the second connecting unit to engage the support with the at least one locking step according to the preset radius of curvature.

16. The protective case of claim 1, wherein the cover connected to the first connecting unit pivots to the rear side of the main body by a preset angle about the first connecting unit such that an edge opposite to the first connecting unit comes in contact with a surface on which the protective case is disposed;
wherein the support is connected to the cover such that an edge of the cover comes in contact with the surface and at least some region of the support comes in contact with the surface;
wherein the second connecting unit connecting the cover to the support comes in contact with the surface when one of the cover and the support comes in contact with the surface; and
wherein the main body has a second supported state where the edge of the main body comes in contact with the surface and is spaced apart from the cover by various angles about the first connecting unit.

17. The protective case of claim 16, wherein the main body comprises a third slide-prevention unit provided at a side contacting with the surface to prevent the main body from sliding along the surface.

18. The protective case of claim 17, wherein when the support is rotated about the second connecting unit to extend towards the rear side of the main body, the second slide prevention unit is exposed to a surface to stabilize the protective case and the third slide prevention unit is at least partially enclosed by the support and the cover.

19. A protective case for a mobile terminal comprising:
a main body having a front side adapted to receive a mobile terminal and having a rear side opposite the front side, the rear side including at least one first slide prevention unit;
a first connecting unit provided at a distal end of the main body;
a cover connected to the main body by the first connecting unit, the first connecting unit pivotable to allow rotation of the cover about the first connecting unit relative to the main body; and
a second connecting unit provided at a distal end of the cover including at least a second slide prevention unit on a first surface of the second connecting unit, and a third slide prevention unit on a second surface of the second connecting unit; and
a support connected to the cover by the second connecting unit, the second connecting unit pivotable to allow rotation of the support about the second connecting unit relative to the cover, the support further including a preset radius of curvature connected to the second connecting unit,
wherein when the cover is rotated about the main body by the first connecting unit to stand the mobile terminal, and the support is rotated about the second connecting unit to extend towards the rear side of the main body, the second slide prevention unit is exposed to a surface to stabilize the protective case and the third slide prevention unit is at least partially enclosed by the support and the cover.

20. A protective case for a mobile terminal comprising:
a main body having a front side adapted to receive a mobile terminal and having a rear side opposite the front side, the rear side including at least one first slide prevention unit;
a first connecting unit provided at a distal end of the main body;
a cover connected to the main body by the first connecting unit, the first connecting unit pivotable to allow rotation of the cover about the first connecting unit relative to the main body; and
a second connecting unit provided at a distal end of the cover, the second connecting unit including at least a second slide prevention unit on a first surface of the second connecting unit, and a third slide prevention unit on a second surface of the second connecting unit; and
an support connected to the cover by the second connecting unit, the second connecting unit pivotable to allow rotation of the support about the second connecting unit relative to the cover, the support further including a preset radius of curvature connected to the second connecting unit,
wherein, when the cover is rotated about the main body by the first connecting unit to stand the protective case on terminal edges of the main body and the cover and the support is rotated about the second connecting unit to extend towards the rear side of the main body, the second slide prevention unit is exposed to a surface to stabilize the protective case and the third slide prevention unit is at least partially enclosed by the support and the cover, and
wherein, when the cover is rotated about the main body by the first connecting unit to angle the mobile terminal relative to a surface and supported by the cover, the support is pivoted about the second connecting unit to engage the support with the rear side of the main body at a point inwards from a terminal edge of the main body according to the preset radius of curvature,
wherein, when the cover covers the front side of the main body, the support connected to the cover is disposed on the rear side of the main body.

* * * * *